2,859,204

METHYLOLATED COMPOSITIONS AND PRODUCTS DERIVED THEREFROM

Frank P. Florentine, Jr., Stockbridge, and Edmond F. Fiedler, Adams, Mass., assignors to General Electric Company, a corporation of New York No Drawing. Application March 1, 1955
Serial No. 491,534

11 Claims. (Cl. 260—51)

This invention relates to methylol derivatives of hydroxy aromatic compounds having long-chain aliphatic hydrocarbon substituents and to products derived therefrom.

The methylolated compounds of this invention are resinous substances capable of curing to novel, useful products by the application of heat or of being co-reacted with a phenolic compound to produce novel, resinous products, which in turn are capable of many uses, particularly in the fabrication of new and useful molding compositions.

The novel methylol compositions of this invention are generally prepared by effecting reaction between a compound such as formaldehyde or paraformaldehyde and a mixture of "spaced polyphenols," hereinafter defined, in the presence of alkaline or alkaline earth metal hydroxides, such as the hydroxides of sodium, potassium, barium, calcium, etc.

The term "spaced polyphenols" as used herein includes a type of material generally referred to in the art as a wax phenol. More concisely, the latter term is used to designate the product of the alkylation of a phenol by a chlorowax. Since the preparation of the alkylated products is not limited to a chlorowax, the broader term "spaced polyphenols" is preferred. More specifically, the term "spaced polyphenols" is intended to cover polyarylolated hydrocarbon having phenolic nuclei separated from each other by polymethylene chains, prepared by any one of several available methods.

Unexpectedly, we have found that the introduction into the spaced polyphenol molecules of methylol groups ($—CH_2OH$) enables the product to be co-reacted later with other materials having active hydrogen atoms through condensation with the elimination of water. It is also intended within the scope of this invention to resinify such methylolated compounds only to such an extent that a minimum amount of time is necessary to complete the curing of resinous materials produced by reaction of this product with other substances. The methylolated products require but little further heating to complete curing, whether used alone or in conjunction with other materials to form novel products. However, they retain reactivity, which enables them readily to be reacted with active hydrogen compounds, such as phenols.

Although the spaced phenols inherently have such a structure that their inclusion in, for example, a phenolic resin, seems to make the resin flexible and resilient, the spaced polyphenols are inherently slow relative to phenol, to react with a material such as formaldehyde or paraform. This has been substantiated by unsuccessful attempts to co-condense spaced phenols and phenol simply by reacting paraform, spaced polyphenols, and, for instance, ordinary phenol, all together in the presence of alkali or acid. For example, ordinary phenol reacts with paraform so much more rapidly than does the spaced polyphenols that the phenol-formaldehyde resin actually reaches the insoluble, infusible condition before the spaced polyphenols have reacted to any significant extent, and the resulting product is not homogeneous. Stated more concisely, the paraform reacts preferentially with ordinary phenol. This is illustrated in several of the examples found in a later portion of this specification. On the other hand, if the spaced polyphenols are reacted with the paraform first, in accordance with the process of this invention, formaldehyde (derived from paraform) becomes chemically bound to the spaced polyphenols in such a form that further reaction with phenol can occur to give homogeneous products. Additionally, the final product cures much more rapidly than it would if the spaced polyphenols were not pre-reacted in this way.

In preparing the "spaced polyphenols," useful in formulating the compositions of this invention, mixtures of chlorinated straight-chain hydrocarbons having from about 12 to about 30 carbon atoms, 15 to about 45 percent, by weight, of chlorine, and having an average molecular weight of from about 250 to about 600, are preferred. For example, one ultimate source of the polymethylene chains, more particularly the chains between phenolic residues in the spaced polyphenols, can be a predominantly paraffinic, straight-chain hydrocarbon mixture, such as a petroleum wax. However, as disclosed above, the physical state is immaterial, and oils of similar chemical nature and molecular weight can also be employed. A hydrocarbon mixture of either description can be chlorinated by means known to the art, and a hydroxy aromatic compound alkylated with the resulting chlorinated hydrocarbon mixture in the presence of a Friedel-Crafts catalyst at elevated temperatures to yield the requisite spaced polyphenol. A preferred method of alkylation is that disclosed and claimed in the copending application of Hathaway, Serial No. 480,607, filed January 7, 1955, now U. S. Patent 2,800,512, and assigned to the assignee of the present invention.

Since there is uncertainty as to the structure of the spaced polyphenols, their constitution may best be defined in terms of the manner of their preparation. For the purpose of the present process, it is highly desirable that each hydrocarbon chain be substituted with the residue of a hydroxy aromatic compound, for example, a phenolic nuclei at, on the average, of at least two points in a given hydrocarbon chain. The underlying principle for this requirement is that the interposition of these long, flexible, polyatomic chains between phenol nuclei confers flexibility and resilience on cured resins formed from the spaced polyphenols. For a $C_{20}$ to $C_{25}$ hydrocarbon, this would correspond to a minimum of about 15 percent of chloride, by weight of the chlorinated hydrocarbon. As a further consideration, it is also necessary that the degree of chlorination be less than 45 percent when, for example, a $C_{20}$–$C_{25}$ hydrocarbon is used, so that the average hydrocarbon chain length between phenol nuclei be not so short that the effect is lost. When hydrocarbons of other molecular weights, for example, $C_{12}$ to $C_{30}$, are used, the maximum degree of chlorination as indicated previously would remain about the same, i. e., about 45 percent, but the minimum percentage of chlorine may vary, corresponding to about 2 chlorine atoms per hydrocarbon molecule.

In effecting the alkylation of the hydroxy aromatic compound, the chlorine is essentially completely displaced from the chlorinated hydrocarbon by the hydroxy aromatic residue. The average degree of substitution varies depending on the ratio of hydroxy aromatic compound to chlorine reacted. Although not known with certainty, it is presumed that substitution is predominantly ortho- and/or para to the hydroxyl group.

In the spaced polyphenols, the minimum average degree of actual substitution by alkyl groups on, for example, phenol nuclei, should be 1, otherwise there is free phenol in the mixture, which is undesirable. This, of course, does not preclude the possibility that during the preparation of the spaced polyphenols, excess phenol may be used and the unreacted part of this excess phenol substantially removed during the working up of the spaced polyphenols. It is the calculated, actual constitution of the spaced polyphenol rather than the proportions of the reactants used to prepare it that is denoted here. The maximum permissible average degree of substitution is dictated by the necessity that some positions ortho or para to the phenolic hydroxyl group be left open for later condensation with a material such as paraform in the preparation of the methylolated spaced polyphenols. This means that the average degree of substitution must be less than three per phenol nucleus in the spaced polyphenol, assuming that all the alkylation has been ortho and/or para to the phenolic hydroxyl group. The preferred range for average degree of actual substitution of alkyl groups on the phenol nuclei is from about 1 to about 2.5 per phenol nucleus. This readily can be calculated from the amounts of phenol/chlorine actually consumed during the preparation of the polyphenol, or, alternatively, may be measured by the amount of formaldehyde or paraform with which a spaced polyphenol is capable of reacting under alkaline conditions.

The aromatic hydroxy compounds which may be alkylated as described above include resorcinol, hydroquinone, catechol, xylenol, hydroxy-diphenyl, benzyl phenol, phenyl ethyl phenol, methyl hydroxy diphenyl, ethyl hydroxy diphenyl, etc., guaiacol, alpha and beta naphthols, alkyl naphthols, etc., phenyl naphthol, tolyl naphthol, xylyl naphthol, benzyl naphthol, etc., as well as halogenated and etherified derivatives thereof.

The quantity of formaldehyde or paraformaldehyde which may be reacted with the spaced polyphenols in forming the methylolated spaced polyphenols will vary. In general, the preferred quantity of either of these compounds is such that the number of methylene groups it contributes is equivalent to one-half the total number of free ortho and para positions available on the phenolic residues in the spaced polyphenols up to a number of methylene groups equivalent to the total available reactive ortho and para phenolic positions in the spaced polyphenols.

In order that those skilled in the art may more readily understand the present invention, the following examples, showing the preparation of methylolated spaced polyphenols, are given by way of illustration and not by way of limitation. All parts and percentages are by weight.

EXAMPLE 1

This example is given to show the development of incompatibility when spaced polyphenols, large amounts of phenol, and caustic are all reacted together. A mixture of:

| | Parts |
|---|---|
| 1.4–19.5[1] spaced polyphenol | 5 |
| Phenol | 5 |
| Paraform (91% CH$_2$O) | 3.3 |
| 10% aqueous NaOH | 0.5 |

[1] First number represents number of chlorine atoms to one mol of phenol used in preparation of spaced polyphenol (in this case based on chlorinated paraffin wax); second number represents percent chlorine in chlorinated hydrocarbon wax used to prepare spaced polyphenol.

was stirred at 110° C., resulting in a vigorous reaction and a turbid mixture. On further heating, there resulted a mixture of two distinct phases, thus illustrating a lack of compatibility and a non-homogeneous, rather than homogeneous, resin.

EXAMPLE 2

This example is given to show the development of incompatibility when a spaced polyphenol, large amounts of phenol, and an acid are reacted together. A mixture of:

| | Parts |
|---|---|
| 1.5–17 spaced polyphenol | 15 |
| Phenol | 15 |
| Paraform 100 mesh (98% CH$_2$O) | 4.5 |
| 0.8 N sulfuric acid | 0.2 |
| Hexamethylenetetramine (in 50 parts acetone) | 3.3 | was reacted in a stirred flask at 90° C. The initial, clear solution became a dark, red brown, turbid mass on continued heating for a total of 45 minutes. The mass was dissolved in an acetone solution of hexamethylenetetramine and films cast therefrom were cured for five hours at 100° C., resulting in a non-homogeneous mixture of a soft, crumbly substance surrounded by a hard, brittle material.

The following examples illustrate the preparation of spaced polyphenol-paraform reaction products of this invention.

EXAMPLE 3

A methylolated spaced phenol was prepared from the following composition:

| | Parts |
|---|---|
| 1.7–19 spaced polyphenol | 60 |
| Phenol | 2 |
| 91% (CH$_2$O) paraform | 18.4 |
| 50% aqueous NaOH | 1.5 |

This mixture was stirred under reflux for 1.5 hours at approximately 90° C. A viscous, resinous mass was obtained which cured on a hot plate at 175° C. in five minutes. Analysis of this product (before curing) indicated that 0.34 mol of formaldehyde, or about 60 percent of that charged, had been consumed exclusive of that calculated to have been consumed by the ordinary phenol.

EXAMPLE 4

Another methylolated spaced polyphenol was prepared by reacting the following mixture:

| | Parts |
|---|---|
| 1–19.5 spaced polyphenol | 15 |
| Phenol | 0.5 |
| 91% (CH$_2$O) paraform | 4.6 |
| 50% aqueous (NaOH) sodium hydroxide | 0.2 |

This mixture was stirred under reflux for 4 hours at approximately 110° C. to give a resinous product. Analysis indicated that 0.1 mol of formaldehyde had been consumed, exclusive of that calculated to have been consumed by the ordinary phenol.

EXAMPLE 5

A methylolated spaced polyphenol was prepared in accordance with the present invention by reacting the following mixture:

| | Parts |
|---|---|
| 1.7–19 spaced polyphenol | 60 |
| Paracresol | 1.2 |
| 50% aqueous sodium hydroxide | 0.5 |
| 91% (CH$_2$O) 100-mesh paraform | 15.6 |

The mixture was stirred under reflux for 2.5 hours at about 90° C. The product obtained was very viscous and cured on a hot plate at 150° C. in 20 seconds.

The methylolated spaced polyphenols prepared in accordance with Examples 3, 4 and 5 are valuable products having varied uses. For example, they can be used as binders for fibrous materials, as protective coatings in the preparation of laminating varnishes and ultimate laminates, molding compositions, or adhesives, etc. When used for these purposes curing temperatures ranging from 50 to 200° C. may be employed.

The methylolated spaced polyphenol of the present invention can also be used to advantage in preparing novel resinous products. More particularly, the methylolated spaced phenols can be condensed with phenols in the presence of an acid to form products which may be termed "cross-condensates." The condensation probably takes the following course, the —CH₂OH referring to the methylolated spaced polyphenol:

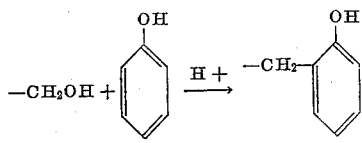

or

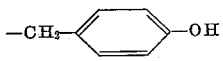

In addition to this reaction, if there is unreacted paraform present in the material, it will condense with phenol or with the phenolic nuclei in the "cross-condensate" in the normal manner.

The "cross-condensates" may be prepared by reacting a phenol with a methylolated spaced polyphenol in the presence of an acid. The result of this reaction is a homogeneous, resinous material which is capable of many and varied uses. For example, this resinous material can be cured by further reaction with formaldehyde or hexamethylenetetramine, much as in the manner of conventional novolac resins. While any phenolic material can undergo this reaction, providing it has open positions ortho or para to the phenolic hydroxyl, it is preferred to condense ordinary phenol with the reaction product of paraform and spaced polyphenols. In effecting the reaction, any acidic catalyst can be used provided a sufficient quantity is used to insure that the reaction mixture be definitely acid. Processing conditions may be varied within certain limits. For example, the reaction temperature may be maintained from room temperature up to about 200° C., the preferred temperature being from 100 to 120° C.

In preparing the novel "cross-condensates" of the present invention, the proportions employed depend upon the properties of the resin desired. For example, the proportions of phenol to spaced polyphenolparaform reaction product or methylolated spaced polyphenol can vary from about 2 to 98 percent, by weight of the reaction mixture, or, conversely, the proportion of spaced polyphenol-paraform reaction product to phenol can vary from about 98 to about 2%, by weight of the reaction mixture. Selected proportions within these ranges depend on the degree to which the properties of the resin differ from those of ordinary phenolic resins. If there is unreacted paraform in the reaction mixture, either the phenol must be present in high enough proportion or the reaction must be terminated early enough, for example, by cooling, to avoid premature gelation.

The phenols which may be cross-condensed with the polyphenols of this invention may be selected from among those previously listed as suitable for alkylation in preparing the spaced polyphenols.

The following examples are given as illustrations of "cross-condensate" reaction products which may be prepared in accordance with the present invention. All parts and percentages are by weight.

EXAMPLE 6

58 parts of phenol and 1.7 parts of 18 Normal H₂SO₄ were added to the product of Example 3. This mixture was stirred under reflux for 0.5 hour at approximately 90° C. Thereafter, an additional 3.5 parts of paraform were added and the mixture stirred at approximately 115° C. for an additional 0.5 hour. By analysis, it was shown that only 0.07 mol formaldehyde remained unreacted. When dissolved in acetone, filtered and evaporated to dryness, the resulting resin was clear and homogeneous.

EXAMPLE 7

Another cross-condensate was prepared by adding 15 parts of phenol and a small quantity of 18 Normal sulfuric acid to the reaction product of Example 4. This mixture was stirred at approximately 110° C. for about 0.5 hour to give a perfectly clear and homogeneous mixture.

EXAMPLE 8

Still another cross-condensate was prepared by adding 60 parts of phenol and 1.1 parts of 18 Normal sulfuric acid to the reaction product of Example 5. After refluxing this mixture for 1.5 hours, it was determined that all of the formaldehyde had reacted. The product was neutralized with 0.4 part Ca(OH)₂ and dehydrated by vacuum distillation. A clear, resinous mass resulted.

Although it is difficult to determine exactly the course of the reaction during the cross-condensation, except that formaldehyde and phenol are both consumed, it is presumed that before the phenol and acid are added, the spaced polyphenol-paraform product will cure very readily, particularly if acid is added. Once phenol and acid are added, the mixture will not cure on heating, not even in part. This agrees with the presumed immediate cross-condensation of methylol groups with added phenol.

The novel cross-condensates prepared in accordance with Examples 5, 6 and 8 are believed to be new and novel and are eminently suitable for many and varied uses. For example, these cross-condensates can be used as plasticizers for phenolic resins and other types of compatible plastic compounds.

In addition to the foregoing use for the cross-condensates of this invention, these cross-condensates are also useful in the preparation of other novel resinous compositions. More particularly, they can be reacted with formaldehyde, paraform or equivalent material, under acid conditions, to give a resinous product which, on mixing with hexamethylenetetramine, for example, can be heat-cured to a resin having flexibility and impact strength superior to conventional phenolic resins. As another use, these products can be reacted with hexamethylenetetramine directly to give a heat-curing resin having the advantages of the first enumerated use. Still another use for the cross-condensates is in the reaction with formaldehyde, paraform or an equivalent material under alkaline conditions, to give heat-curing resins having the advantages recited for the first specified use. The resins which can be obtained in accordance with the foregoing processes can be used to advantage in many applications, such as in molding compounds, laminates, brake-band resins, coatings, and abrasive bonding, where superior flexibility, easier flowing at high temperature, and/or improved impact resistance are desirable.

The following examples illustrate the preparation of heat-curing resins in accordance with the methods outlined above. All parts and percentages are by weight.

EXAMPLE 9

The resinous product of Example 6 was dissolved in acetone, and an alcoholic solution of hexamethylenetetramine corresponding to 10 percent of the weight of the resin was added. Upon evaporation of the solvents, a clear resin was obtained, which cured on the hot plate at 150° C. to a clear, homogeneous film. This material was compounded with a filler and tested as indicated in Table I below.

EXAMPLE 10

To the product obtained in accordance with Example 8 were added 13.9 parts of hexamethylenetetramine. The mixture was stirred at about 90° C. under reflux for approximately 45 minutes, after which it was poured out and allowed to cool. The resulting resin had a stroke cure of 30 seconds at 150° C.

EXAMPLE 11

To the product of Example 7 were added 5.5 parts of paraform subsequent to making the product alkaline with a small quantity of 50 percent aqueous sodium hydroxide. The mixture was stirred at about 110° C. for approximately 0.5 hour, then poured out and allowed to cool. It cured on a hot plate at 150° C. in 5 minutes to a nearly clear, homogeneous film of good strength and flexibility. Even in the cold condition, it could be bent double upon itself and creased without breaking.

Example 9 is illustrative of a cross-condensate hardened with acid paraform and subsequently compounded with hexamethylenetetramine. This is analogous to the ordinary 2-stage resin process. Example 10 is somewhat similar to the processes of Example 9 with the differences that a higher proportion of hexamethylenetetramine/paraform is used, and the hexamethylenetetramine is added to the reaction kettle instead of during the compounding. Example 11 is illustrative of the method of adding sufficient paraform to the cross-condensate to cure it, it hardening somewhat with basic catalyst before pouring. This is analogous to the ordinary 1-stage resin process.

The resins of Examples 9 and 10 and a conventional phenolic were compounded with an equal weight of wood flour by milling on differential rolls. Each compound was compression molded into 1/8 in. by 2 in. square slabs, which were sawed into 1/8 in. by 3/8 in. by 5/8 in. pieces, and tested on the Dynstat (Schopper) testing machine for determining impact strength. In addition to the characteristics shown below in Table I, the molded pieces were of good appearance, were free of surface defects, were well knit and homogeneous when a broken cross section was viewed, and flowed readily in the molds.

Table I

| Property | Conventional Wood Flour Filled Phenolics | Resin of Example 9 | Resin of Example 10 | |
|---|---|---|---|---|
| Milled at: | | | | |
| °F | | 250 | Unheated | |
| min | | 1 2 | 5 | |
| Molded at: | | | | |
| °F | 330 | 320 | 330 | |
| p. s. i | 2,000 | 3,000 | 3,000 | |
| min | 5 | 2 | 2 | 5 |
| Impact strength (dynstat, ft. lb.) | 0.036 | 0.062 | 0.075 | 0.068 |

[1] Cooled to 150° F. to remove from roll.

From the results shown above in Table I, the superiority in impact strength of the molded products of this invention over the impact strength of the conventional wood-flour filled phenolic is obvious. The magnitude of improvement is close to 100 percent or higher.

What we claim as new and desire to secure by Letters Patent of the United States is:

1. The method of preparing resinous condensation products which comprises (1) reacting together, under alkaline conditions, (a) a mixture of spaced polyphenols, said spaced polyphenols comprising the product of heat reacting in the presence of a Friedel-Crafts catalyst (i) a monohydroxy benzene compound selected from the group consisting of monohydroxy benzene and substituted monohydroxy benzene in which the substitution is selected from the group consisting of alkyl groups, alkoxy groups and halogen radicals and (ii) a mixture of chlorinated hydrocarbons having from about 12 to about 30 carbon atoms per molecule, from about 15 to about 45 percent, by weight of the chlorinated hydrocarbon, of chlorine and having a molecular weight in the range of about 250 to about 600, and in which spaced polyphenols the average degree of substitution of hydrocarbon groups per monohydroxy benzene ring is less than three, with (b) a reactive methylene compound selected from the group consisting of formaldehyde and paraformaldehyde, to form a mixture of methylolated spaced polyphenols, the reactive methylene compound being present in sufficient quantity to give a number of methylene groups equivalent to from one-half the total number of free reactive ortho and para positions available on the monohydroxy benzene rings in the spaced polyphenols up to a number of methylene groups equivalent to the total available reactive ortho and para positions in the spaced polyphenols, and (2) thereafter reacting the resulting methylolated products, in the presence of an acid catalyst, with a phenol selected from the group consisting of phenol and substituted monophenols in which the substitution is selected from the group consisting of alkyl groups, alkoxy groups and halogen radicals.

2. The method of claim 1 in which the reactive methylene compound is formaldehyde.

3. The method of claim 1 in which the reactive methylene compound is paraformaldehyde.

4. The method of claim 1 in which the methylolated products are reacted with phenol.

5. As a new composition of matter, the resinous condensation products obtained in accordance with the process of claim 1.

6. The method of preparing resinous condensation products which comprises (1) reacting together, under alkaline conditions, (a) a mixture of spaced polyphenols, said spaced polyphenols comprising the product of heat reacting in the presence of a Friedel-Crafts catalyst (i) a monohydroxy benzene compound selected from the group consisting of monohydroxy benzene and substituted monohydroxy benzene in which the substitution is selected from the group consisting of alkyl groups, alkoxy groups and halogen radicals and (ii) a mixture of chlorinated hydrocarbons having from about 12 to about 30 carbon atoms per molecule, from about 15 to about 45 percent, by weight of the chlorinated hydrocarbon, of chlorine and having a molecular weight in the range of about 250 to about 600, and in which spaced polyphenols the average degree of substitution of hydrocarbon groups per monohydroxy benzene ring is less than three, with (b) a reactive methylene compound selected from the group consisting of formaldehyde and paraformaldehyde, to form a mixture of methylolated spaced polyphenols, the reactive methylene compound being present in sufficient quantity to give a number of methylene groups equivalent to from one-half the total number of free reactive ortho and para positions available on the monohydroxy benzene rings in the spaced polyphenols up to a number of methylene groups equivalent to the total available reactive ortho and para positions in the spaced polyphenols, (2) reacting the resulting methylolated products, in the presence of an acid catalyst, with a phenol selected from the group consisting of phenol and substituted monophenols in which the substitution is selected from the group consisting of alkyl groups, alkoxy groups and halogen radicals, to form a resinous cross-condensate, and (3) reacting the cross-condensate with a member selected from the group consisting of formaldehyde and paraformaldehyde under acid conditions to form a heat-curing resinous product.

7. The heat-curing resin obtained in accordance with the process of claim 6.

8. A resin having improved flexibility and impact strength obtained by heat-curing a composition comprising the reaction product of claim 6 and hexamethylenetetramine.

9. A molding composition comprising the product of claim 8, and a filler.

10. The method of producing a homogeneous, strong and flexible, resinous film which comprises (1) reacting together, under alkaline conditions, (a) a mixture of spaced polyphenols, said spaced polyphenols comprising the product of heat reacting in the presence of a Friedel-Crafts catalyst (i) a monohydroxy benzene compound selected from the group consisting of monohydroxy benzene and substituted monohydroxy benzene in which the substitution is selected from the group consisting of alkyl groups, alkoxy groups and halogen radicals and (ii) a mixture of chlorinated hydrocarbons having from about 12 to about 30 carbon atoms per molecule, from about 15 to about 45 percent, by weight of the chlorinated hydrocarbon, of chlorine and having a molecular weight in the range of about 250 to about 600, and in which spaced polyphenols the average degree of substitution of hydrocarbon groups per monohydroxy benzene ring is less than three, with (b) a reactive methylene compound selected from the group consisting of formaldehyde and paraformaldehyde, to form a mixture of methylolated spaced polyphenols, the reactive methylene compound being present in sufficient quantity to give a number of methylene groups equivalent to from one-half the total number of free reactive ortho and para positions available on the monohydroxy benzene rings in the spaced polyphenols up to a number of methylene groups equivalent to the total available reactive ortho and para positions in the spaced polyphenols, (2) reacting the resulting methylolated products, in the presence of an acid catalyst, with a phenol selected from the group consisting of phenol and substituted monophenols in which the substitution is selected from the group consisting of alkyl groups, alkoxy groups and halogen radicals, to form a resinous cross-condensate, and (3) rendering said cross-condensate alkaline, reacting the cross-condensate with a reactive methylene compound selected from the group consisting of formaldehyde and paraformaldehyde and curing the reaction mixture to form a clear, homogeneous film of good strength and flexibility.

11. As a new article of manufacture, a clear, homogeneous, strong and flexible, resinous film produced in accordance with the method of claim 10.

References Cited in the file of this patent

UNITED STATES PATENTS

| | | |
|---|---|---|
| 2,228,159 | Wassenegger et al. | Jan. 7, 1941 |
| 2,416,218 | Reiff | Feb. 18, 1947 |
| 2,429,565 | Reiff | Oct. 21, 1947 |